May 22, 1956     R. J. BARBERA     2,746,700
CHRISTMAS TREE STAND
Filed April 30, 1952     2 Sheets-Sheet 1
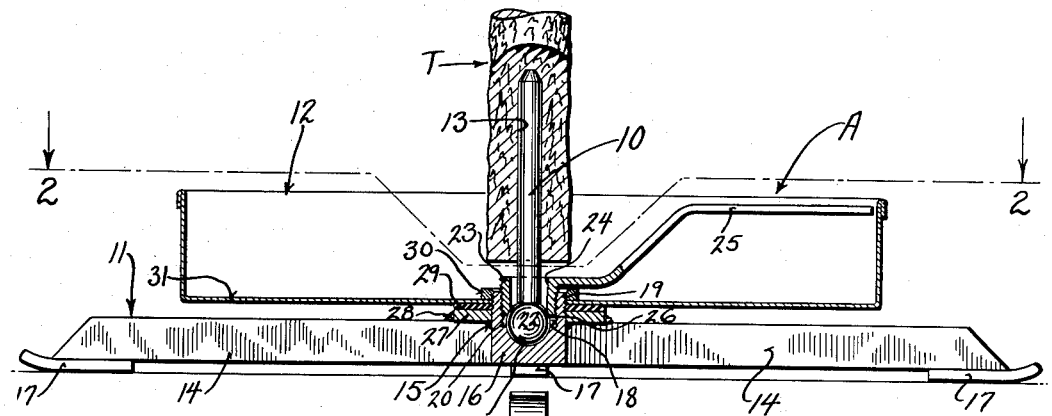
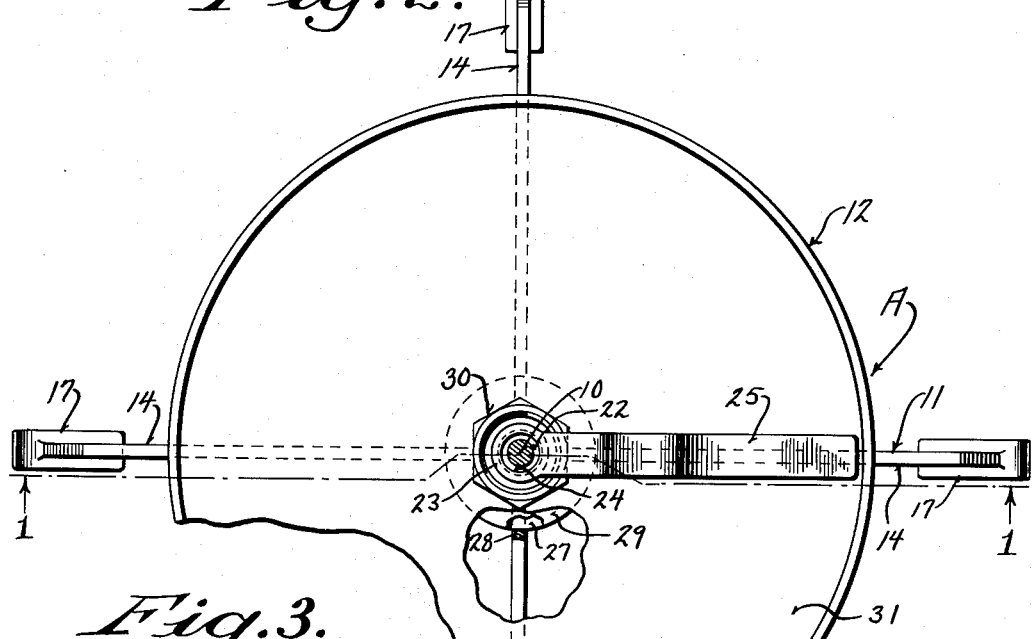
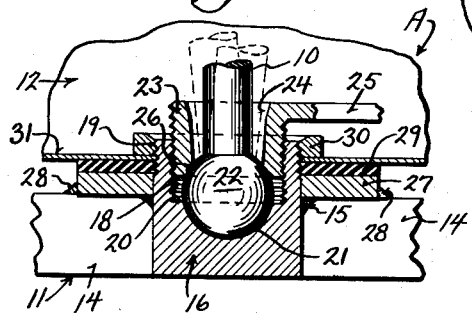
INVENTOR
RICHARD J. BARBERA
BY *Young Wright*
ATTORNEYS May 22, 1956 R. J. BARBERA 2,746,700
CHRISTMAS TREE STAND Filed April 30, 1952 2 Sheets-Sheet 2

INVENTOR
RICHARD J. BARBERA

BY
*Mowng Wright*

ATTORNEYS

United States Patent Office 2,746,700
Patented May 22, 1956

2,746,700
CHRISTMAS TREE STAND
Richard J. Barbera, Green Bay, Wis.

Application April 30, 1952, Serial No. 285,240

2 Claims. (Cl. 248—44)

My invention appertains to tree holders and more particularly to a novel holder which will effectively support an ordinary Christmas tree in an upright position without the necessity of clamping devices, screws, etc.

A primary object of my invention is to provide a novel Christmas tree holder having a stable base whereby, trees having varied trunk diameters may be held in a secure upright position.

A more specific object of my invention is to provide an upright peg or spike secured to the base and which is received in an axial bore of the tree trunk.

Another important object of my invention is to provide means whereby, the upright peg or spike may be adjusted angularly so that trees having crooked trunks or branches can be held in a near vertical position to give a straight appearance to the tree.

A further object of my invention is to provide a water receptacle associated with my base and upright peg whereby, trees held thereon may be maintained in a freshened condition.

A still further object of my invention is to provide a simple, practical and reliable construction that is economical to manufacture, easy to assemble and positive in its operation.

A still further important object of my invention is to provide a Christmas tree stand, so constructed that a wide staple base will be provided, yet one which will not interfere with the lowermost branches of the tree, so that said branches can be retained to enhance the appearance of the tree, and one which permits the base of the tree to be mounted close to the floor.

With these and other objects in view, and to the end of attaining any other advantages hereinafter appearing, this invention consists in certain features of construction, combination and arrangements of parts hereinafter described, pointed out in the claims and illustrated in the accompanying drawings.

In the said drawings:

Figure 1 is a vertical sectional view of my device taken on the line 1—1 of Figure 2 of the drawings, looking in the direction of the arrows and showing the proper position of the tree trunk on the upright peg or spike;

Figure 2 is a top plan view of my device, partly in section, certain parts being broken away to illustrate further details of construction, the section being represented by the line 2—2 of Figure 1 of the drawings and looking in the direction of the arrows;

Figure 3 is an enlarged fragmentary sectional view of the adjusting means for the peg or spike, as shown in Figure 1 of the drawings;

Figure 4:
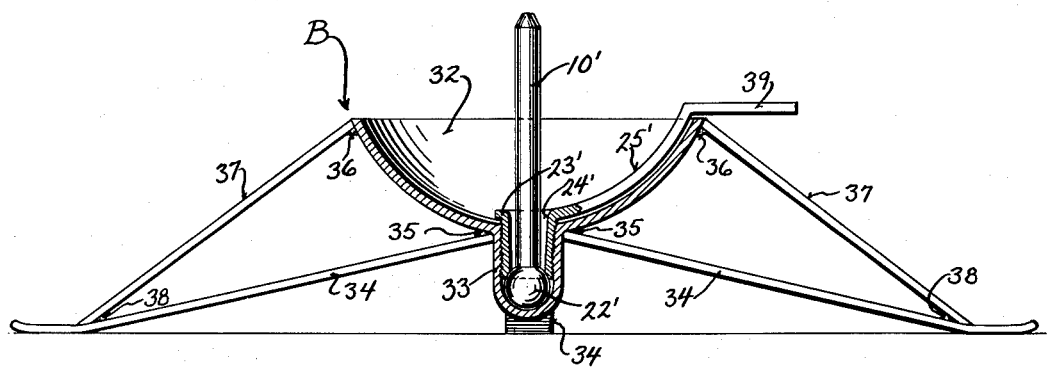
Figure 4 is a vertical sectional view of a modified form of my device taken on the line 4—4 of Figure 5, and looking in the direction of the arrows.
Figure 5:
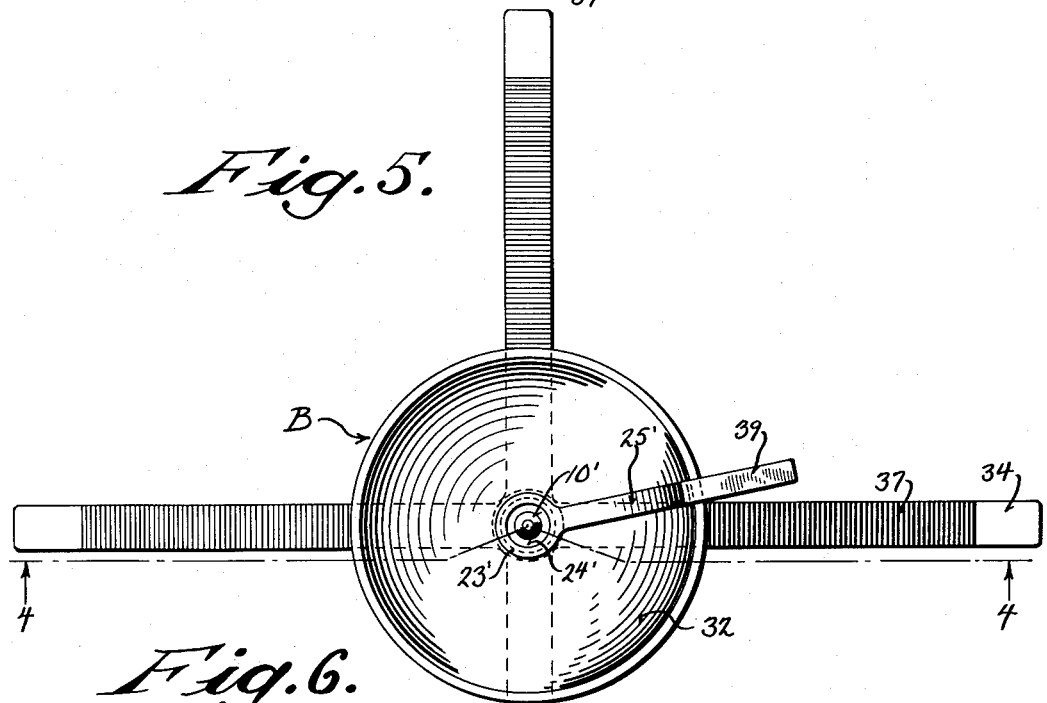
Figure 5 is a top plan view of the tree holder illustrated in Figure 4 of the drawings.
Figure 6:
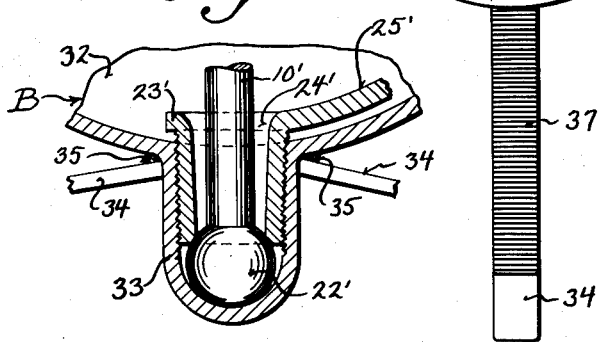
Figure 6 is an enlarged fragmentary sectional view of the adjusting means shown in Figure 4 of the drawings.

Referring to the drawings in detail, wherein similar reference characters designate corresponding parts throughout the several views, the letter "A" generally indicates one type of my improved tree holder and the same includes broadly, the upright peg or spike 10, stable base 11 and the water receptacle 12. As shown, the tree "T" is provided with an axial bore 13 which receives a portion of the peg or spike 10.

The base 11 includes legs 14 which are welded or otherwise secured at 15 to a socket member 16. The outer ends of the legs 14 may be provided with ground engaging feet or shoes 17. The socket member 16 is cup shaped and is provided with internal threads 18 and external threads 19. The inner surface of the bottom wall 20 of the socket member 16 is provided with a rounded semi-spherical socket 21. Into the rounded socket 21 is received the ball end 22 of the peg or spike 10. Engaging the internal threads 18 is an elongated locking nut 23 which is provided with an enlarged axial bore or opening 24 and a laterally extending handle portion 25, integral with its upper end. The lower inner periphery 26 of the locking nut 23, is arcuately shaped to engage the ball end 22 of the peg 10.

It is readily apparent from the above, that by rotating the handle 25 of the nut 23 in one direction, the ball end 22, of the peg 10, may be clamped tightly between the socket 21 and the arcuate portion 26, of the nut 23, and that by turning the handle 25 in the opposite direction, the ball end 22 may be loosened so that the peg 10 can assume any universal angular position represented by the dotted lines of Figure 3 of the drawings. This will accommodate trees having crooked trunks so that the same may be adjusted to be held in an upright vertical position to give a desired straight appearance to the tree.

Received around the outer periphery of the socket member 16 and rigidly secured thereto, is a circular strengthening member 27 and it is to be noted that the legs 14 are also welded at 28 to the strengthening member 27. Over the strengthening member 27 is a similarly shaped circular rubber sealing gasket 29 and on top of this is received the pan 12. Lock nut 30 is utilized to firmly secure the pan to the base and it is readily apparent that the rubber gasket 29 will prevent the leakage of water from the pan to the supporting surface.

In utilizing my device, the tree "T," as stated above, is provided with an axial bore 13, into which the peg 10 is inserted and it is to be noted that the length of the bore is such that the bottom of the tree is spaced above the bottom 31, of the pan 12, to accommodate any necessary angular adjustment of the peg 10. The tree is adjusted until it gives a straight appearance and the handle 25, of the lock nut 23, is than rotated to firmly lock and hold the ball 22 in the desired selected position.

In Figure 4, I have illustrated a modified type of holder "B" in which the water receptacle 32 is formed integral with the socket member 33. In this form of the invention, the receptacle 32 is firmly held to the legs 34 by welding or otherwise securing the end of the legs at 35 to the bottom of the receptacle 32 about the socket member 33. To provide further support, the upper periphery of the receptacle 32 has welded thereto, at 36, brace bars 37 which extend downwardly and are also securely welded at 38 to the legs 34. The peg 10' is provided with the ball end 22' which is, in turn, received in the bottom of the socket 33. The socket 33 is also internally threaded and receives the lock nut 23' which has formed therein, the axial bore 24' through which the peg 10' extends and which accommodates the angular movement thereof. A handle 25' is also provided and in this form of the invention, the handle 25' follows the inner contour of the receptacle 32 and thence extends laterally outward to provide the operative portion or hand grip 39.

The operation of this modified form is similar to the form illustrated in Figures 1, 2 and 3 of the drawings. The tree being received on the peg 10' and the handle rotated to loosen the ball end 22' so that the tree may be adjusted to its vertical upright position. The handle 25' is then rotated so that the lock nut 23' firmly secures the ball end 22' in its socket.

From the above, it can be seen that I have provided a low lying tree stand so that the base of the tree can be mounted very close to the floor. It also can be seen that, as the pans or reservoirs are of a low type and that the tree is solely supported by the peg, the necessity of trimming off lower branches of a tree is eliminated. Consequently, my stand permits the retaining of the very lowest limbs of a tree and there will be no disfiguring of the tree at all.

It is to be also understood that the legs or feet of the bases can be provided with openings, whereby, the stand can be bolted to a large base or floor in the event of mounting an extremely large tree such as those used in schools or churches.

From the foregoing, it is believed that the features and advantages of my invention will be readily apparent to those skilled in the art and it will, of course, be understood that changes in the form, proportion and minor details of construction may be resorted to without departing from the spirit of the invention or the scope of the appending claims.

I claim:

1. A tree holder comprising, a base, a cup shaped socket member secured to said base and having a semi-spherical inner bottom wall, an upright elongated peg of relatively large diameter throughout its entire length having a ball end received in said socket member and semi-spherical inner bottom wall, said socket member carrying internal threads, a correspondingly threaded elongated nut received in said socket member above the ball end of said peg having a portion adapted to engage the upper surface of the ball, said locking nut having an axial bore therethrough through which said peg extends upwardly said elongated peg being of a size and configuration to extend upwardly for a substantial distance itno the base of a tree and forming the sole support therefor, and a laterally extending operating handle secured to said locknut, whereby, turning of the handle in one direction will allow free rotative movement of the ball end in the socket and the turning of the handle in the opposite direction will firmly hold the ball end against movement.

2. A tree holder comprising a base, a cup shaped socket member secured to said base having a semi-spherical inner bottom wall, a water receptacle about said socket member, an upright peg having a ball end received in said socket member and semi-spherical inner bottom wall, said socket member carrying internal threads, a correspondingly threaded elongated nut received in said socket member above the ball end of said peg having a portion adapted to engage the upper surface of the ball, said locking nut having an axial bore therethrough through which said peg extends upwardly, and a laterally extending operating handle secured to said lock nut, whereby, turning of the handle in one direction will allow free rotative movement of the ball end in the socket and the turning of the handle in the opposite direction will firmly hold the ball end against movement.

References Cited in the file of this patent

UNITED STATES PATENTS

| | | |
|---|---|---|
| 362,115 | Rosenblatt | May 3, 1887 |
| 1,372,777 | Samuel et al. | Mar. 29, 1921 |
| 1,829,964 | Randall | Nov. 3, 1931 |
| 2,390,920 | Caron | Dec. 11, 1945 |
| 2,543,849 | Hendrickson | Mar. 6, 1951 |
| 2,617,617 | Krastel et al. | Nov. 11, 1952 |

FOREIGN PATENTS

| | | |
|---|---|---|
| 8,312 | Great Britain | Apr. 26, 1895 |
| 224,303 | Germany | July 16, 1910 |
| 229,611 | Germany | Jan. 4, 1911 |
| 235,181 | Germany | June 3, 1911 |